(12) United States Patent
Wiegers et al.

(10) Patent No.: US 6,650,884 B1
(45) Date of Patent: Nov. 18, 2003

(54) COMBINED MARINE ENTERTAINMENT SYSTEM AND DEPTH SOUNDER

(75) Inventors: Michael Richard Wiegers, Olathe, KS (US); Brian Poindexter, Gardner, KS (US)

(73) Assignee: Garmin Corporation, Taipei (TW)

( * ) Notice: Subject to any disclaimer, the term of this patent is extended or adjusted under 35 U.S.C. 154(b) by 82 days.

(21) Appl. No.: 10/005,727

(22) Filed: Nov. 8, 2001

Related U.S. Application Data

(63) Continuation of application No. 09/412,908, filed on Oct. 5, 1999, now Pat. No. 6,345,179.

(51) Int. Cl.[7] .................................................. H04B 1/06
(52) U.S. Cl. .......................... 455/344; 455/352; 367/98
(58) Field of Search ................................ 455/344, 345, 455/346, 352, 353; 367/98, 111

(56) References Cited

U.S. PATENT DOCUMENTS

| | | | |
|---|---|---|---|
| 4,829,493 A | * 5/1989 | Bailey ........................ 367/111 |
| 4,873,676 A | * 10/1989 | Bailey et al. .................. 367/98 |
| 4,939,661 A | * 7/1990 | Barker et al. ................ 364/443 |
| 5,991,722 A | * 11/1999 | Thompson et al. ......... 704/258 |
| 6,370,037 B1 | * 4/2002 | Schoenfish .................. 361/807 |

* cited by examiner

Primary Examiner—Edward F. Urban
Assistant Examiner—Thuan T. Nguyen
(74) Attorney, Agent, or Firm—Devon A. Rolf

(57) ABSTRACT

A combined marine entertainment system and depth sounder (10) that more efficiently utilizes limited marine instrument panel space, that is more convenient and simple to operate, and that shares certain components and, therefore, is less expensive to manufacture and install. The apparatus includes a main unit (12) and a separate remote unit (14). The main unit includes a housing (16); an entertainment assembly including a display (20) and an entertainment component (18) positioned in the housing; and a depth sounder assembly including a depth display (48) positioned within the same housing as the entertainment assembly display and entertainment component.

24 Claims, 3 Drawing Sheets

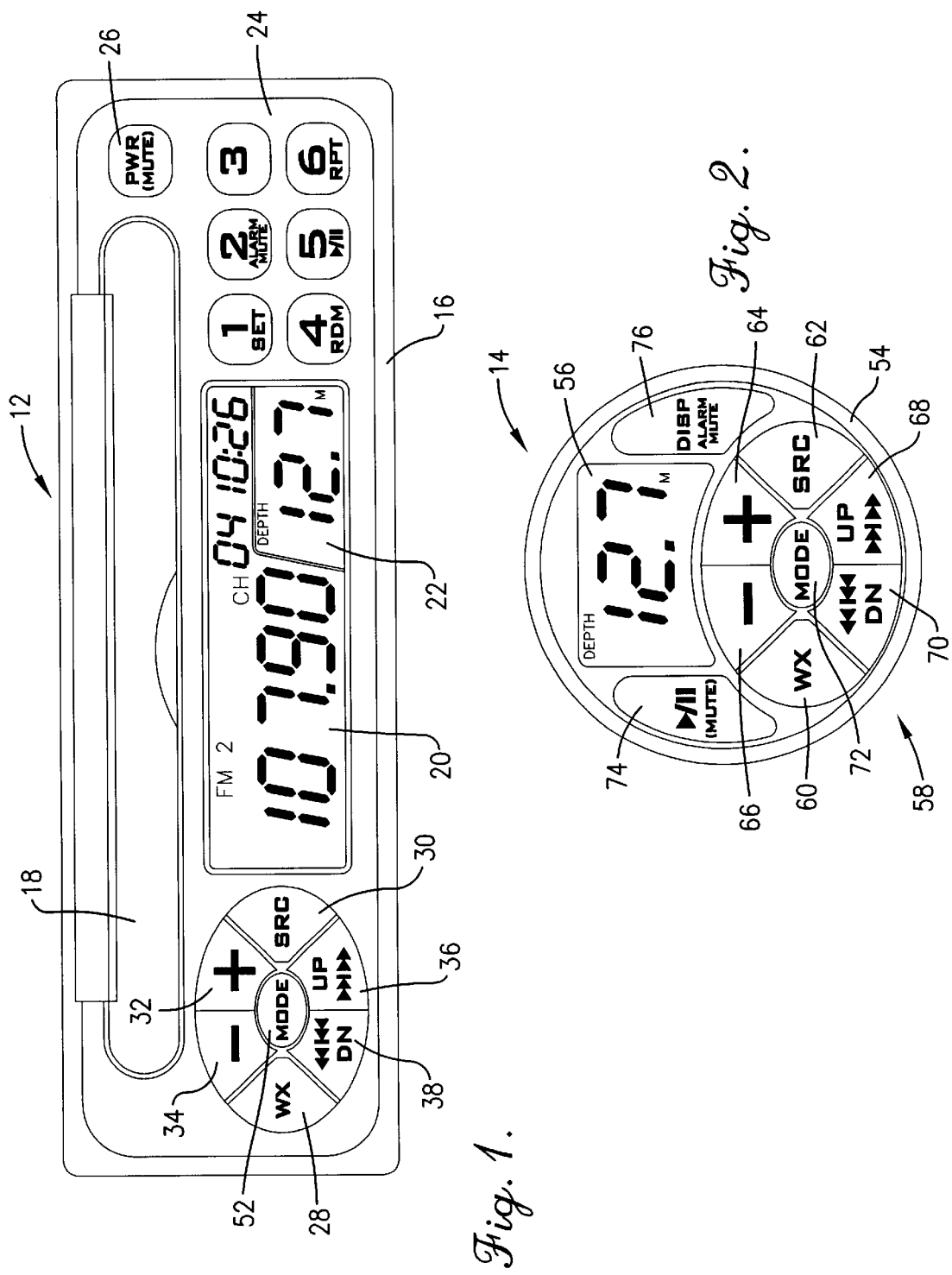

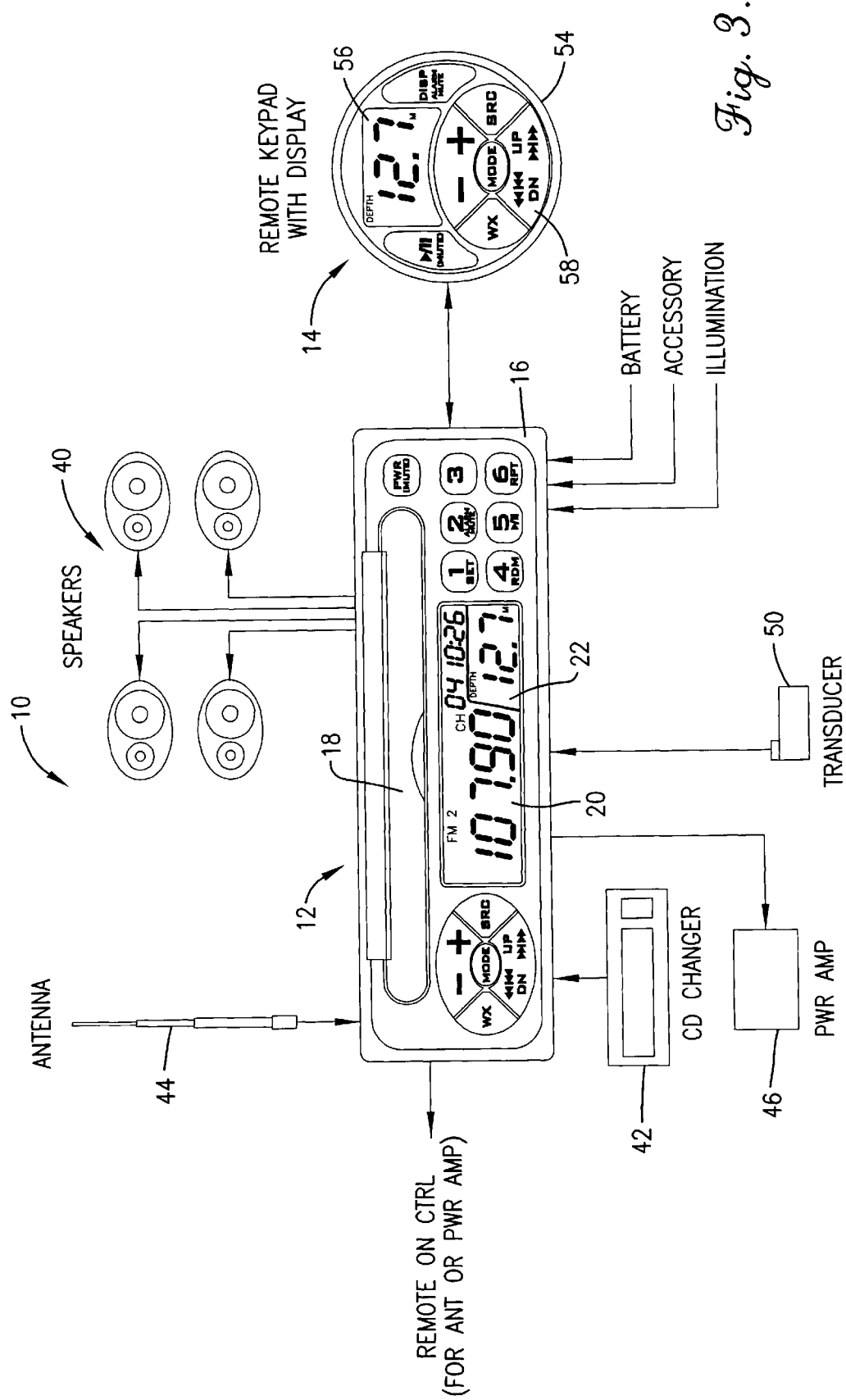

COMBINED MARINE ENTERTAINMENT SYSTEM AND DEPTH SOUNDER

RELATED APPLICATIONS

This application is a continuation of application Ser. No. 09/412,908, filed Oct. 5, 1999 now U.S. Pat. No. 6,345,179, and entitled "Combined Marine Entertainment System and Depth Sounder".

BACKGROUND OF THE INVENTION

1. Field of the Invention

The present invention relates to marine entertainment and information systems. More particularly, the invention relates to a combination marine entertainment system and depth sounder that more efficiently utilizes limited space on a boat instrument panel, that is more convenient to operate, and that is more economical to manufacture.

2. Description of the Prior Art

Many boats are outfitted with both entertainment systems and depth sounders. Unfortunately, prior art marine entertainment systems and depth sounders are manufactured and installed separately in their own housings, necessitating the mounting of both devices on or near a boat's instrument panel so that both can be easily seen and operated. Those familiar with boats will appreciate that the typical marine instrument panel is crowded with a multitude of gauges and instruments and, therefore, space is extremely limited. Another limitation with the prior art practice of manufacturing and installing marine entertainment systems and depth sounders separately is that the controls, displays and other components of the devices are duplicated, thus increasing both the costs to manufacture and the complexity of operating the devices.

Accordingly, there is a need for improved marine entertainment systems and depth sounders that overcome the limitations of the prior art.

OBJECTS AND SUMMARY OF THE INVENTION

The present invention solves the above-described problems and provides a distinct advance in the art of marine entertainment and information systems. More particularly, the present invention provides a combined marine entertainment system and depth sounder that more efficiently utilizes limited marine instrument panel space, that is more convenient and simple to operate, and that shares certain components and, therefore, is less expensive to manufacture and install.

The combined marine entertainment system and depth sounder of the present invention broadly includes a housing; an entertainment assembly including a display and an entertainment component positioned in the housing; and a depth sounder assembly including a depth display positioned within the same housing as the entertainment assembly display and entertainment component.

The entertainment component of the entertainment assembly may be one or more of the following: a commercial broadcast AM receiver, a commercial broadcast FM receiver, a NOAA weather radio band receiver, a compact disc player, a digital video disc player, a mini-disc player, a cassette tape player, an audio playback apparatus, a low-level audio input driven by an external audio source, a low-level audio output to drive external audio equipment, a digital audio input, a digital audio output; or any other conventional entertainment device. The depth display is configured to be coupled with a depth sounder transducer for receiving depth information therefrom and for displaying the depth information.

The housing, entertainment assembly, and depth display described above make up a main unit of the marine entertainment and information apparatus. In preferred forms, the apparatus also includes a separate remote unit positioned outside the housing of the main unit and operatively coupled therewith. The remote unit includes a remote housing, a remote depth sounder display positioned within the remote housing for remotely displaying the depth information, and remote controls for remotely controlling operation of the entertainment assembly and the depth sounder assembly.

By constructing a combined marine entertainment system and depth sounder as described herein, numerous advantages are realized. For example, by positioning components of the entertainment assembly and depth sounder in a common housing that can be mounted in a single opening of a marine instrument panel, valuable marine cockpit space is saved. Moreover, by combining the components of the entertainment assembly and depth sounder into a single unit, displays, controls, and certain other components required by both devices can be combined, further saving instrument panel space and simplifying the operation and use of the devices. Furthermore, the sharing of certain components of the devices reduces the manufacturing and installation costs of the apparatus.

BRIEF DESCRIPTION OF THE DRAWING FIGURES

A preferred embodiment of the present invention is described in detail below with reference to the attached drawing figures, wherein:

FIG. 1 is an elevational view of the main unit of a combined marine entertainment system and depth sounder apparatus constructed in accordance with a preferred embodiment of the present invention.

FIG. 2 is an elevational view of the remote unit of the apparatus.

FIG. 3 is a schematic diagram illustrating the coupling of other components to the main unit and the remote unit.

DETAILED DESCRIPTION OF THE PREFERRED EMBODIMENTS

Figure 4:
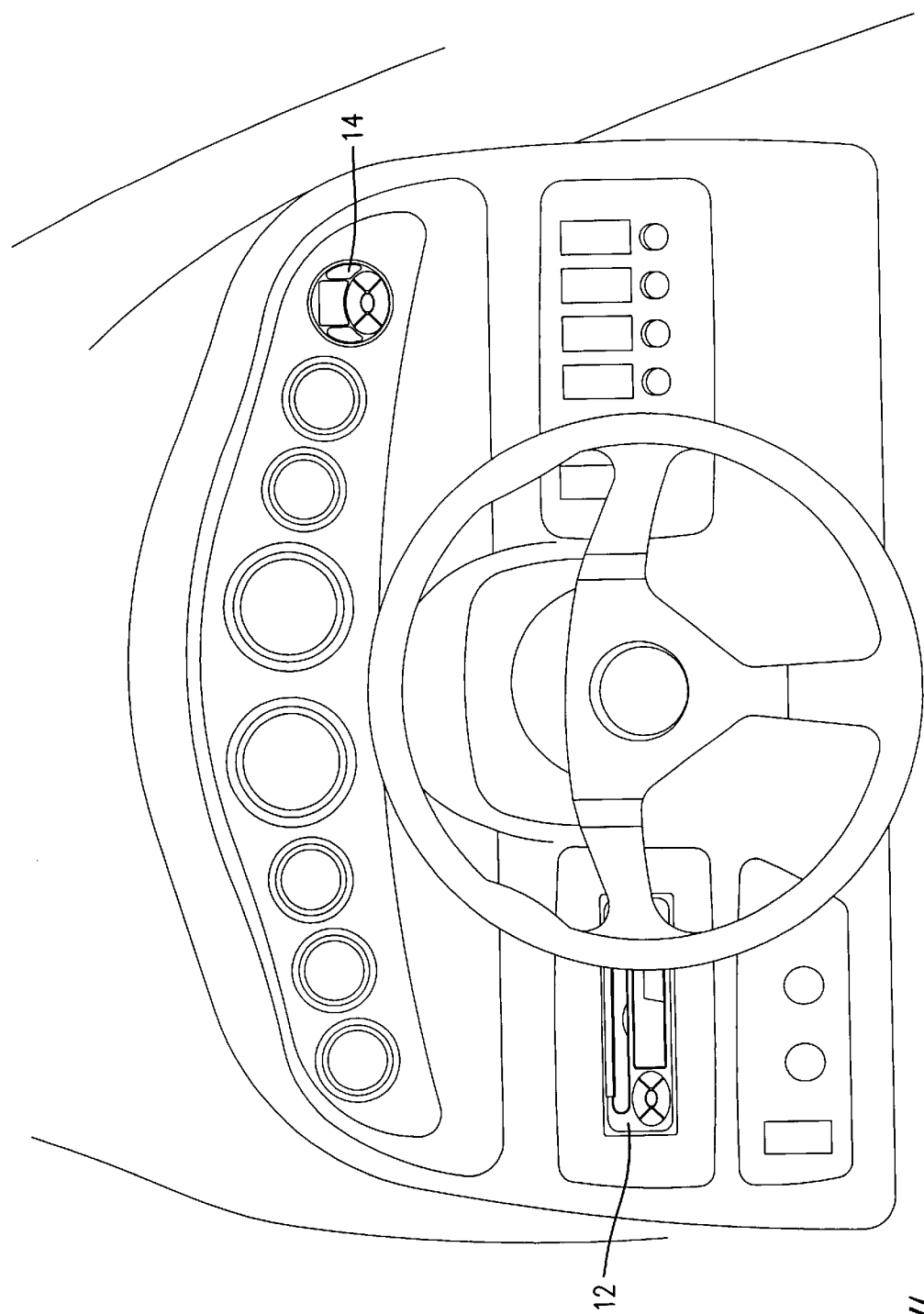
FIG. 4 is a perspective view of the cockpit of a typical boat showing an exemplary mounting of the main unit and the remote unit of the present invention.

Turning now to the drawing figures and particularly FIG. 3, a marine entertainment system and depth sounder apparatus 10 constructed in accordance with a preferred embodiment of the present invention is illustrated. The apparatus is configured for mounting in or near an instrument panel of a marine cockpit as illustrated in FIG. 4 and broadly includes a main unit 12 and one or more remote units 14.

The main unit 12, which is illustrated in more detail in FIG. 1, includes an outer housing 16, portions of an entertainment assembly including an entertainment component 18 and display 20 positioned in the housing, and portions of a depth sounder assembly including a display 22 also positioned within the housing. The housing is conventional and may be formed of any conventional material such as synthetic resin materials, but is preferably manufactured from high-impact resistant plastic alloys. The housing is preferably similar in size and shape as housings typically used for automobile stereo systems.

The entertainment component 18 may be a commercial broadcast AM receiver, a commercial broadcast FM receiver, a NOM weather radio band receiver, a compact disc player, a digital video disc player, a mini-disc player, a cassette tape player, an audio playback apparatus, a low-level audio input driven by an external audio source, a low-level audio output to drive external audio equipment, a digital audio input, a digital audio output; or any other conventional entertainment device positioned in the housing 66.

The entertainment display 20 is positioned in the housing so that it is visible from the front of the main unit as illustrated in FIGS. 1 and 3. The display is preferably a liquid crystal display (LCD).

The entertainment assembly also includes controls mounted to the housing so that they are visible from the front of the assembly for operating the assembly. The controls may include a keypad 24 for presetting certain information such as radio channels and pushbuttons for conventional features such as power 26, weather band (WX) 28, source (SRC) 30, increase volume (+) 32, decrease volume (−) 34, scan forward (UP) 36, and scan backward (DN) 38.

As illustrated in FIG. 3, the entertainment assembly may also include externally mounted speakers 40, a CD changer 42, an antenna 44, a power amplifier 46, and other conventional entertainment components. The entertainment assembly is preferably powered by a battery such as the battery provided in a conventional boat. Operation of certain functions of the entertainment assembly are performed by an internal microprocessor, microcontroller, or other computing device (not shown).

The depth sounder display 22 is also mounted in the housing 16 as best illustrated in FIG. 1. The display is preferably an LCD. The depth sounder assembly also includes an external depth sounder transducer 50 illustrated in FIG. 3. The transducer is preferably a sonic-type depth transducer but may be any device operable to determine depth information and to display the depth information in the depth display. The depth sounder assembly may also include controls for controlling operation of the assembly and be configured for receiving user-configurable depth offsets.

In preferred forms, the depth sounder display 22 comprises a portion of the entertainment assembly display 20 as illustrated in FIGS. 1 and 3. This permits the depth information to be displayed alongside information on the entertainment assembly to reduce the number of components in the apparatus and, therefore, reduce space requirements and manufacturing costs. Similarly, operation of the depth sounder assembly is preferably accomplished with the same controls provided with the entertainment assembly and processing required by the depth sounder assembly may be performed by the microprocessor or microcontroller provided with the entertainment assembly. A "mode" switch 52 is provided to switch the controls between the entertainment assembly and the depth sounder assembly. Once again, the use of common controls and microprocessor or microcontroller for the entertainment assembly and the depth sounder assembly reduces the components of the apparatus and, therefore, conserves space and costs.

The remote unit 14, which is best illustrated in FIG. 2, is separate from the main unit 12 and is operably coupled therewith. The remote unit may be coupled with the main unit by conventional wires or cabling or may alternately communicate with the main unit via wireless transceivers positioned in both units. The remote unit broadly includes a remote housing 54, a remote display 56, and remote controls 58. The remote unit may also include its own microprocessor, microcontroller or other computing device.

The remote housing 54 is preferably sized to fit within a standard marine instrument opening as illustrated in FIG. 4. The housing may be formed of any conventional material such as synthetic resin materials, but is preferably manufactured from high-impact resistant plastic alloys.

The remote display 56 is provided for remotely displaying the entertainment information and/or the depth information that is also displayed on the main unit 12. The remote display is also preferably an LCD.

The remote controls 58 may include pushbuttons similar to the pushbuttons on the main unit including pushbuttons for features such as weather band (WX) 60, source (SRC) 62, increase volume (+) 64, decrease volume (−) 66, scan forward (UP) 68, scan backward (DN) 70, mode 72 (for switching the controls and display between the entertainment assembly and the depth sounder assembly), mute 74 (for muting or pausing the entertainment assembly), and display 76 (for switching the display between the entertainment assembly and the depth sounder assembly and for muting a depth sounder alarm).

The apparatus 10 of the present invention may also include additional remote units (not shown) that may be positioned elsewhere in the boat. For example, the apparatus may include remote units similar to the one illustrated in FIG. 2 except that the display or the controls may be removed.

In preferred forms, the depth sounder assembly also includes an alarm circuit for sounding an audible alarm during certain conditions. For example, the alarm circuit may be configured to sound an alarm if the depth of the body of water being monitored is below a certain threshold level. The audible alarm may be a separate alarm such as a bell or horn, but is preferably sounded over the speakers 40 of the entertainment assembly. This further reduces the required number of components of the apparatus, saving mounting space and manufacturing and instruction costs.

In accordance with another aspect of the present invention, the entertainment assembly includes an automatic muting circuit for muting the entertainment assembly when the audible alarm of the depth sounder is sounding so that only the depth alarm is heard over the speakers 40.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A marine entertainment and information apparatus comprising: a housing;
    an entertainment assembly including a display and an audio component, the display and the audio component being positioned in the housing; and
    a depth display positioned within the housing with the entertainment assembly display and audio component and configured to be coupled with a depth sounder transducer for receiving depth information therefrom and for displaying the depth information.

2. The apparatus as set forth in claim 1, the audio component being selected from the group consisting of: a commercial broadcast AM receiver, a commercial broadcast FM receiver, a NOAA weather radio band receiver, a compact disc player, a digital video disc player, a mini-disc player, a cassette tape player, an audio playback apparatus, a low-level audio input driven by an external audio source, a low-level audio output to drive external audio equipment, a digital audio input, and a digital audio output.

3. The apparatus as set forth in claim 1, wherein the depth display comprises a portion of the display of the entertainment assembly.

4. The apparatus as set forth in claim 1, further including controls positioned on the housing for controlling operation of the entertainment assembly.

5. The apparatus as set forth in claim 4, the depth display being a part of a depth sounder assembly, wherein the controls are also configured for controlling operation of the depth sounder assembly.

6. The apparatus as set forth in claim 1, further including a remote unit positioned outside the housing and operatively coupled with the entertainment assembly and the depth display, the remote unit including a remote housing, a remote depth sounder display positioned within the remote housing for remotely displaying the depth information, and remote controls for remotely controlling operation of the entertainment assembly and the depth display.

7. The apparatus as set forth in claim 6, wherein the remote housing is sized to fit within a marine instrument opening.

8. The apparatus as set forth in claim 5, the controls including a keypad and a plurality of pushbuttons.

9. The apparatus as set forth in claim 6, the remote controls including pushbuttons.

10. The apparatus as set forth in claim 6, wherein the remote unit is coupled with the entertainment assembly and the depth display by wires.

11. The apparatus as set forth in claim 6, wherein the remote unit is coupled with the entertainment assembly and the depth display by a wireless communication assembly.

12. The apparatus as set forth in claim 5, the entertainment assembly and depth sounder assembly including a single computing device positioned within the housing for controlling functions of both the entertainment assembly and the depth sounder assembly.

13. The apparatus as set forth in claim 1, further including a single power supply for powering both the entertainment assembly and the depth display.

14. The apparatus as set forth in claim 5, the depth sounder assembly further including an alarm circuit for sounding an audible alarm during a depth alarm condition, the entertainment assembly including an automatic muting circuit for muting the entertainment assembly when the audible alarm of the depth sounder is sounding.

15. The apparatus as set forth in claim 14, the entertainment assembly further including speakers coupled with the component, wherein the audible alarm of the depth sounder assembly is sounded over the speakers.

16. A marine entertainment and information apparatus comprising:
   a main unit including
      a housing,
      an entertainment assembly including a display and an audio component, the display and the audio component being positioned in the housing, and
      a depth sounder assembly including a depth display positioned within the housing with the entertainment assembly display and component and configured to be coupled with a depth sounder transducer for receiving depth information therefrom and for displaying the depth information; and
   a remote unit operatively coupled with the main unit and including
      a remote housing,
      a remote depth sounder display positioned within the remote housing for remotely displaying the depth information, and
      remote controls for remotely controlling operation of the entertainment assembly and the depth sounder assembly.

17. The apparatus as set forth in claim 16, the audio component being selected from the group consisting of: a commercial broadcast AM receiver, a commercial broadcast FM receiver, a NOAA weather radio band receiver, a compact disc player, a digital video disc player, a mini-disc player, a cassette tape player, an audio playback apparatus, a low-level audio input driven by an external audio source, a low-level audio output to drive external audio equipment, a digital audio input, and a digital audio output.

18. The apparatus as set forth in claim 16, wherein the remote housing is sized to fit within a marine instrument opening.

19. The apparatus as set forth in claim 16, the entertainment assembly and depth sounder assembly including a single microprocessor positioned within the housing for controlling functions of both the entertainment assembly and the depth sounder assembly.

20. The apparatus as set forth in claim 16, further including a single power supply for powering both the entertainment assembly and the depth sounder assembly.

21. The apparatus as set forth in claim 16, the depth sounder assembly further including an alarm circuit for sounding an audible alarm during a depth alarm condition, the entertainment assembly including an automatic muting circuit for muting the entertainment assembly when the audible alarm of the depth sounder is sounding.

22. The apparatus as set forth in claim 21, the entertainment assembly further including speakers coupled with the component, wherein the audible alarm of the depth sounder assembly is sounded over the speakers.

23. A marine entertainment and information apparatus comprising:
   a housing;
   an entertainment component positioned in said housing for outputting entertainment or information, wherein said entertainment component further outputs a display signal including data indicative of said entertainment or information;
   a depth sounder component positioned in said housing and configured to be coupled with a depth sounder transducer, wherein said depth sounder receives depth information from said depth sounder transducer; and
   a display positioned in said housing, wherein said display displays said data indicative of said entertainment or information and said depth information.

24. The marine entertainment as set forth in claim 23, wherein said data and said depth information are displayed simultaneously on said display.

* * * * *

UNITED STATES PATENT AND TRADEMARK OFFICE
CERTIFICATE OF CORRECTION

PATENT NO. : 6,650,884 B1
DATED : November 18, 2003
INVENTOR(S) : Micheal Richard Wiegers and Brian Poindexter It is certified that error appears in the above-identified patent and that said Letters Patent is hereby corrected as shown below:

Column 3,
Line 3, "NOM" should read -- NOAA --

Signed and Sealed this

Seventh Day of June, 2005

JON W. DUDAS
*Director of the United States Patent and Trademark Office*